United States Patent [19]

Hale et al.

[11] Patent Number: 4,690,487
[45] Date of Patent: Sep. 1, 1987

[54] HERMETICALLY SEALED FIBER OPTIC CONNECTOR

[75] Inventors: Charles S. Hale, Sidney; Andrew Matzkin-Bridger, Oneonta; Ronald W. Morse, Sidney, all of N.Y.

[73] Assignee: Allied Corporation, Morris Township, Morris County, N.J.

[21] Appl. No.: 550,833

[22] Filed: Nov. 14, 1983

[51] Int. Cl.⁴ .................................. G02B 6/36
[52] U.S. Cl. ..................... 350/96.21; 350/96.18
[58] Field of Search ............ 350/96.18, 96.20, 96.21, 350/96.22

[56] References Cited

U.S. PATENT DOCUMENTS

| | | | |
|---|---|---|---|
| 3,455,625 | 6/1966 | Brumley et al. | 350/96.22 |
| 3,825,320 | 7/1974 | Redfern | 350/96.18 X |
| 3,951,515 | 4/1976 | Allard | 350/96.22 |
| 4,214,809 | 7/1980 | Reh | 350/96.20 |
| 4,255,016 | 3/1981 | Borsuk | 350/96.21 |
| 4,265,511 | 5/1981 | Nicia et al. | 350/96.21 X |
| 4,281,891 | 8/1981 | Shinohara et al. | 350/96.18 |
| 4,291,941 | 9/1981 | Melzer | 350/96.18 |
| 4,296,999 | 10/1981 | Mead | 350/96.21 |
| 4,307,934 | 12/1981 | Palmer | 350/96.20 |
| 4,371,233 | 2/1983 | Masuda | 350/96.18 |
| 4,383,732 | 5/1983 | Dalgoutte | 350/96.20 |
| 4,451,115 | 5/1984 | Nicia et al. | 350/96.18 |
| 4,469,399 | 9/1984 | Cowen et al. | 350/96.20 |
| 4,563,057 | 1/1986 | Ludman et al. | 350/96.18 |

FOREIGN PATENT DOCUMENTS 0006209  1/1981  Japan .................................. 350/96.20

*Primary Examiner*—William L. Sikes
*Assistant Examiner*—Akm E. Ullah
*Attorney, Agent, or Firm*—Anibal Jose Cortina; Roger H. Criss

[57] ABSTRACT

The invention described is a hermetically sealed fiber optic connector that may be repeatedly coupled and uncoupled. A fiber optic connector assembly incorporating the principles and features of this invention is characterized by an optically transparent window (3), hermetically sealed (6) within a main housing (1) passage (2), a member (30, 40) mounted on each side of the window (3) having axially aligned bores (31, 41) that axially align lenses (10, 20) and their respective optical fibers (81, 83) and a lens holder assembly (70) mounted within a second housing (50) that may be uncoupled from the main housing (1).

4 Claims, 2 Drawing Figures

HERMETICALLY SEALED FIBER OPTIC CONNECTOR

This invention relates to a separable connector for optically coupling separate optical fibers and is more particularly related to a hermetically sealed lens type fiber optic connector.

A fiber optic connector is used to align and optically couple together one or more pairs of optical fibers that transmit signals in the form of light. If the fibers are not precisely aligned or optically coupled an undesirable loss of the light signal occurs. One type of fiber optic connector that is used to obtain maximum optical coupling of fibers includes a pair of lenses located between facing optical fibers to collimate the light from one fiber to another. Examples of such a connector may be found in U.S. Pat. Nos. 4,265,511 issued May 5, 1981 and entitled "Detachable Connector For Optical Fibers," and 4,307,934 issued Dec. 29, 1981 and entitled "Packaged Fiber Optic Modules." In such a connector the axial alignment of the focal point of a lens transmitting light to another lens or optical fiber is essential to transfer light without losses. Further, this optical alignment must be maintained even though a connector may be repeatedly coupled and uncoupled for installation, repair, rearrangement or removal of an optical fiber or a lens. In addition to this, many connectors are used in environments that require an internal hermetic seal between the incoming and outgoing optical fibers. This is especially true in applications where a bulkhead or other barrier separates greatly different physical or chemical environments. For example, in submarines where the outer portion of the connector is hermetically sealed by welding it to a passage through a bulkhead or other barrier.

Neither of the foregoing patents disclose a fiber optic connector that includes a simple internal hermetic seal and lens alignment arrangement while being easily coupled or uncoupled for repair or removal of a defective lens or optical fiber. Accordingly, there is a demand for a hermetically sealed fiber optic connector that may be repeatedly and easily coupled and uncoupled for repair.

SUMMARY OF THE INVENTION

This invention provides an internal hermetic seal for a separable fiber optic connector of the type utilizing a pair of lenses between each pair of optical fibers. The invention also provides a simple arrangement for axially aligning the lenses between the optical fibers to be connected. A fiber optic connector incorporating the principles of this invention is characterized by an optically transparent window, hermetically sealed within a main housing passage, a member on each side of the window, having axially aligned bores that axially align lenses and their respective optical fibers and an assembly for each lens that is separable from the main housing.

Accordingly, one advantage of this invention is that a single hermetic seal within a separable fiber optic connector isolates one side of the connector from the other side of the connector.

Another advantage of this invention is that it provides a hermetically sealed lens type fiber optic connector assembly that is easily uncoupled for repair.

Another advantage of this invention is that it minimizes light loss between optically coupled fibers in a connector assembly that is separable.

Another advantage of this invention is that the use of lenses eliminates the need to polish the ends of the optical fibers before optically coupling the fibers together.

Another advantage of this invention is that it provides a simple arrangement to align separate optical fibers to be optically coupled together.

Another advantage of this invention is that the hermetically sealed connector is easily manufactured.

DETAILED DISCUSSION OF THE INVENTION

Figures 1, 2:
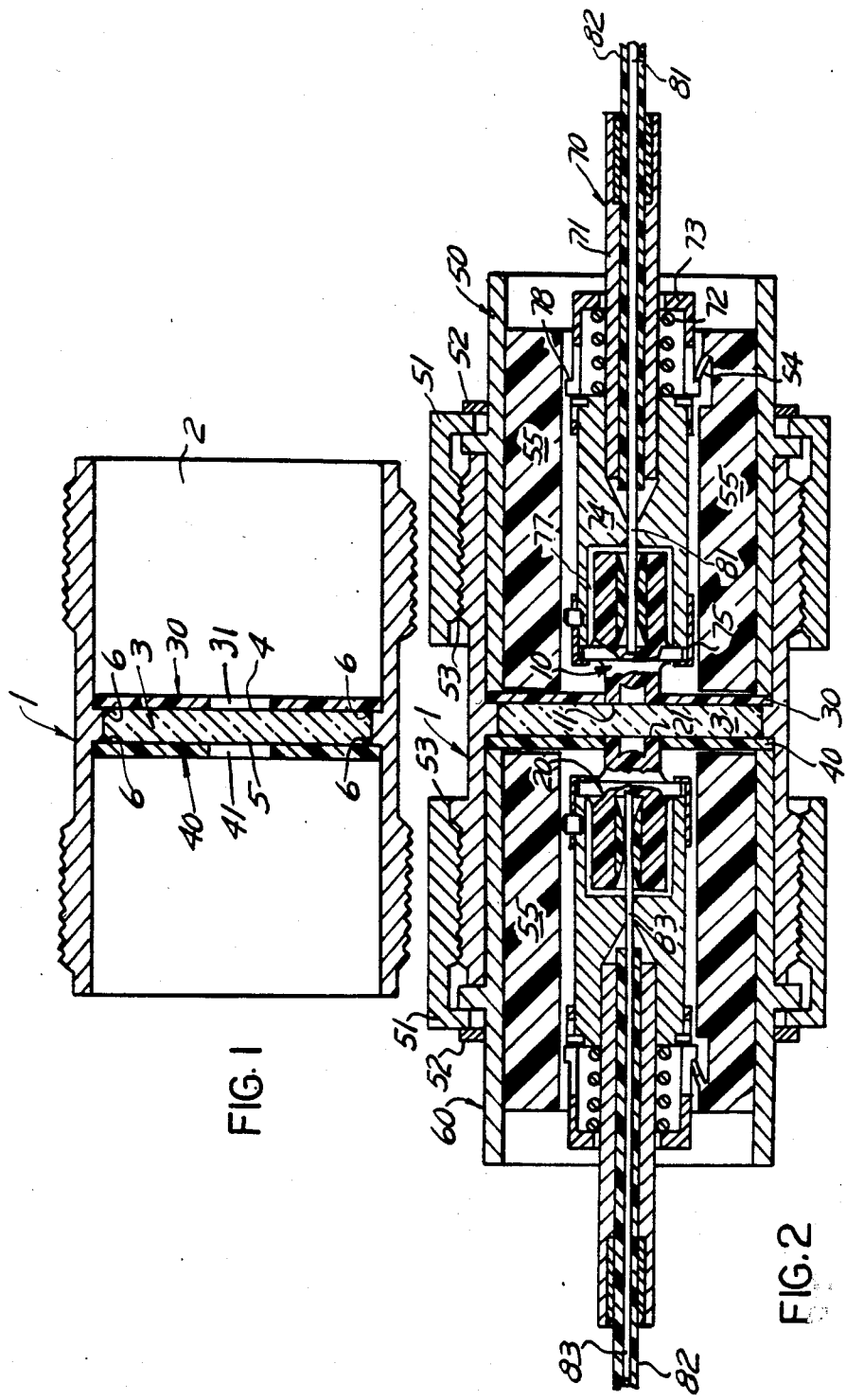
FIG. 1 illustrates the internal hermetic seal within the main housing of a fiber optic connector assembly.
FIG. 2 illustrates a hermetically sealed separable fiber optic connector assembly incorporating the principles of this invention.

FIG. 1 illustrates the internal hermetically sealed portion of the fiber optic connector which includes: a main housing 1 having a central passage 2; an optically transparent window 3 having parallel surfaces 4, 5; and a hermetic seal 6 between the periphery of the window 3 and the wall of the passage 2 in the housing 1. The hermetic seal 6 may be made by first vapor depositing or sputtering a metal coating to the end portion of the window and then soldering together the metal portion of the window and the connector shell with a 60/40 tin/lead solder composition. Another method that may be used to provide a hermetic seal between the window 3 and the wall of the central passage 2 would be a weld between a thick metal deposit on the window and the wall of the passage 2. For a window comprised of a plastic material, the hermetic seal may be accomplished by using an epoxy cement between the window and central passage 2 of the housing 1. The window 3 may also be molded or fused into the central passage 2. If desired, two windows 3 may be used to accomplish the advantages of this invention.

Located on each side of the window 3 are inserts or members 30, 40 each having a bore 31, 41 axially aligned with the other bore. The bores 31, 41 of the members 30, 40 are used to receive and align a pair of lenses (10, 20, FIG. 2). The members 30, 40 are generally made of a semi-rigid material such as plastic or nylon, although metal may also be used. The members 30, 40 are attached to the surface of the window 3 by a cement e.g. silicone rubber. One advantage of cementing the members 30, 40 to the window 3 is that it helps prevent distortion of the members 30, 40 due to any forces asserted against the members by other components of a complete connector assembly.

FIG. 2 illustrates a hermetically sealed separable fiber optic connector assembly incorporating the principles of this invention. The connector assembly includes: a main housing 1; a second housing 50 and a third housing 60. The second housing 50 is connected to the main housing 1 by a threaded 53 coupling nut 51 which is retained on the second housing 50 by a snap ring 52. A first lens 10, a lens holder assembly 70 and an insert 55 are mounted within the second housing 50. The lens holder assembly 70 includes: a body 74 having a central passage; a conduit 71 extending out of one end of the central passage, the other end of the central passage having an enlarged portion 77 receiving one end portion of the first lens 10; a spring 72 mounted within a spring retainer housing 73 that is connected to the holder body 74 by a pair of pins; and a lens retaining cap having a plurality of angled spring fingers 75 at one end of the body 74 for captivating an enlarged portion of the lens 10 so that the lens 10 is secured to the body 74 of the lens holder assembly 70. The function of the tubular member 71 is to hold and guide an optical fiber 81 through the central passage of the body 74 so that it may be optically coupled to the lens 10. The optical fiber 81 includes a protective sheath 82.

The insert 55 in the second housing 50 includes a plurality of radially inwardly extending spring fingers 54 which are resiliently and radially deflectable and engage a shoulder 78 on the lens holder assembly 70 and retain the assembly 70 within the second housing 50. By inserting a tubular tool (not shown) into the insert 55 and around the outside of the spring retainer housing 73, the retaining fingers 54 may be deflected outwardly to allow removal of the lens holder assembly 70 from the second housing 50. The lens holder assembly 70 is mounted in the insert 55 so that the forward facing surface 11 of the lens 10 is in contact with the window 3 of the main housing 1.

On the opposite side of the window 3, of the main housing 1, is a third housing 60 which contains a second lens 20 and another optical fiber 83. The arrangement within the third housing 60 is substantially identical to the arrangement within the second housing 50.

The forwardly facing flat surfaces 11, 21 of the lens 10, 20 are perpendicular to the respective axis of their lens and when the lenses are placed through the bores 31, 41 and against the window 3 axial alignment between lenses 10, 20 is assured.

While a preferred embodiment of the invention has been disclosed, it will be apparent to those skilled in the art that changes may be made to the invention as set forth in the appended claims and, in some instances, certain features of the invention may be used to advantage without corresponding use of other features. For instance, there may be more than one pair of optical fibers and lenses, or the shape of the housings may be other than cylindrical and, in such instance, the coupling nut 51 and threads 53 would be replaced by some form of latch. Accordingly, it is intended that the illustrative and descriptive materials herein be used to illustrate the principles of this invention and not to limit the scope of the invention.

Having described the invention, what is claimed is:

1. A hermetically sealed fiber optic connector for optically coupling separate optical fibers, said connector comprising:
    a main housing having a central passage;
    an optically transparent window located in the central passage, said window having first and second surfaces extending across said central passage;
    a hermetic seal between said window and said housing;
    a first member having a bore therein, said first member located adjacent to the first surface of said window;
    a second member having a bore therein, said second member located adjacent to the second surface of said window, the bore of said second member axially aligned with the bore in said first member;
    a first lens;
    a second housing;
    means for mounting said first lens in said second housing and said second housing to said main housing so that said first lens is axially aligned with the bore of said first member, said means for mounting said first lens axially aligned with the bore of said first member comprising a first insert attached to the window on the side of the first lens and having a bore therethrough of a size sufficient to receive and align the first lens axially with the bore of the first member, and said means further including means for receiving a first optical fiber in axial alignment with said first lens, and said means for receiving said first optical fiber in axial alignment with said first lens being a fiber end receiving slot in said first lens;
    a second lens;
    a third housing separably connected to the other side of said first housing;
    means for mounting said second lens in said third housing and said third housing to said main housing so that said second lens is axially aligned with the bore of said second member, said means for mounting said second lens axially with the bore of the second member comprising a second insert attached to the window on the side of the second lens and having a bore therethrough of a size sufficient to receive and align the second lens axially with the bore of the second member, and said means further including means for receiving a second optical fiber in axial alignment with said second lens, and said means for receiving said second optical fiber in axial alignment with said second lens being a fiber end receiving slot in said second lens;
    said second and third housings each including means for selectively coupling and uncoupling said second and third housings from said main housing; and
    biasing means for biasing said first lens and second lens into tight abutment with said window.

2. The fiber optic connector recited in claim 1 wherein said second and third housings each include a coupling nut threaded to said main housing.

3. The fiber optic connector as described in claim 1 wherein the first and second surfaces of said window are parallel to each other and wherein each lens has a flat surface portion in contact with a respective surface of said window.

4. The fiber optic connector as recited in claim 1 wherein the means for mounting said first lens includes: a lens holder assembly mounted to said first lens with the flat surface of said first lens projecting beyond one end of said holder, the other end of said holder adapted to receive a first optical fiber.

* * * * *